A. WILLIAMS.
LAWN SPRINKLER.
APPLICATION FILED OCT. 8, 1920.
1,418,763.
Patented June 6, 1922.
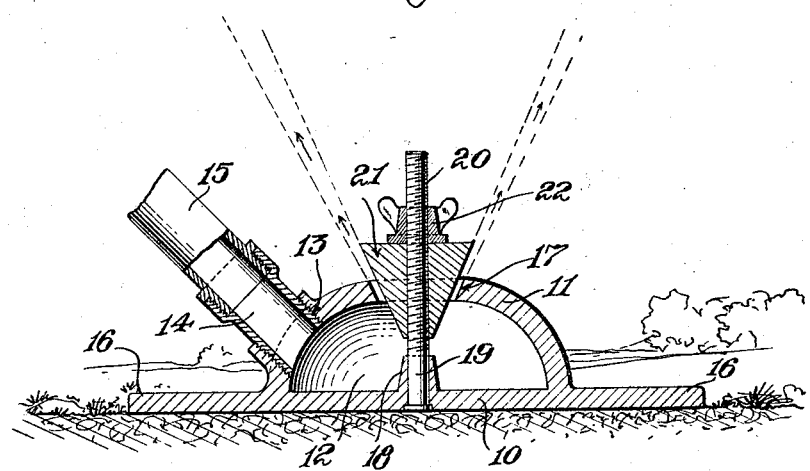
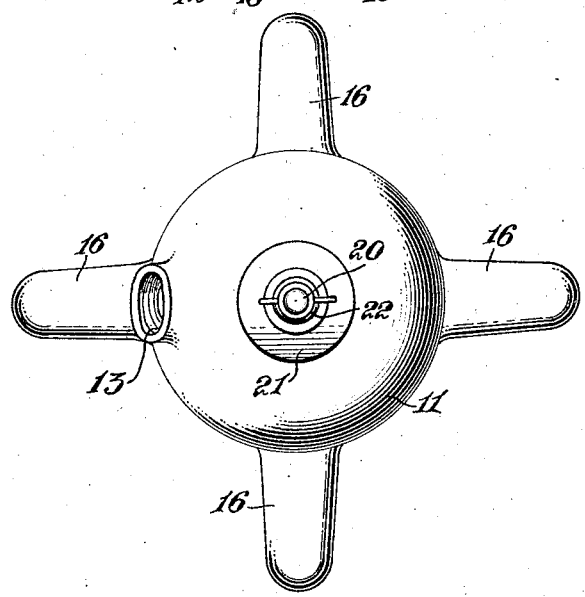
INVENTOR.
Amos Williams
BY
Thomas R. Harner
ATTORNEY.

UNITED STATES PATENT OFFICE.

AMOS WILLIAMS, OF SAWTELLE, CALIFORNIA.

LAWN SPRINKLER.

1,418,763.  Specification of Letters Patent.  Patented June 6, 1922.

Application filed October 8, 1920. Serial No. 415,491.

*To all whom it may concern:*

Be it known that I, AMOS WILLIAMS, a citizen of the United States of America, residing at Sawtelle, in the county of Los Angeles and State of California, have invented certain new and useful Improvements in Lawn Sprinklers, of which the following is a specification.

My present invention relates generally to lawn sprinklers, and my object is the provision of a simple inexpensive construction which may be readily adjusted to vary the spray as desired, which avoids all movable operating parts likely to get out of order and which will obviate the undesirable clogging so commonly a disadvantage of lawn sprinklers now in use.

With these general objects in mind my invention resides in a lawn sprinkler constructed and adapted to operate as I will now describe with respect to the accompanying drawing which illustrates my invention and forms a part of this specification.

In this drawing,

Figure 1 is a vertical section through my improved lawn sprinkler set up for operation, and Figure 2 is a top plan view with the intake nipple disconnected.

Referring now to these figures my improved sprinkler has a flat base plate 10 on which is a rounded casing 11 forming therein a water chamber 12 and having at one side a threaded aperture 13 for the reception of an intake nipple 14 to which a water or fluid supply pipe 15 may be connected.

The base 10 is preferably provided with radially outstanding and circumferentially spaced legs 16 enabling the same to readily seat flatwise upon the ground or other supporting surface without danger of overturning, and for purposes of spray delivery the casing 11 has an upwardly opening outlet 17, the wall of which is preferably apertured as shown in Figure 1.

The base 10 also has a central upstanding boss 18 and through this boss a vertical stem 19 projects upwardly and axially through the outlet 17, its upper portion being threaded as indicated at 20 and forming an adjustable support for a spray regulating cone 21. The cone 21 may be threaded to screw on the stem 20, but is preferably disposed loosely thereon with its smaller end presented downwardly so that upon the cessation of flow, the cone 21 will drop by gravity and close the outlet 17 in order to prevent the entrance of foreign matter between periods of use, which would be likely to clog up the sprinkler and prevent or impair its spray delivery.

In any event upward movement of the cone 21 is limited by an adjusting nut 22 screwing on the stem above the cone and preferably in the nature of a wing nut as clearly shown in Figure 1, so that by adjusting this nut the spray may be readily regulated at all times to suit conditions and the desires of the user.

It is to be observed that my improved sprinkler clearly avoids the use of movable operating parts of a nature likely to get out of order or of a nature susceptible to any considerable wear and that preventing as it does the entrance of foreign matter between periods of use, the sprinkler as a whole will be lasting, efficient and uniformly in condition for proper operation.

I claim:

A sprinkler head including a substantially semi-spherical fluid casing having an inlet opening in its wall at one side of its vertical axis and a flat base adapted to rest evenly and securely upon a flat surface extending across and closing the lower portion of the casing and provided with arms radially outstanding beyond the casing to prevent overturning, said casing having an upper outlet opening in its wall, concentric with its axis, a threaded stem projecting upwardly from the base plate and axially through said opening, a spray adjusting cone on said stem, and a nut on the stem above the cone.

In testimony whereof I have affixed my signature.

AMOS WILLIAMS.